G. L. PATTERSON.
BATTERY BOX TERMINAL CONNECTION.
APPLICATION FILED DEC. 1, 1908.
924,576.
Patented June 8, 1909.
2 SHEETS—SHEET 1.
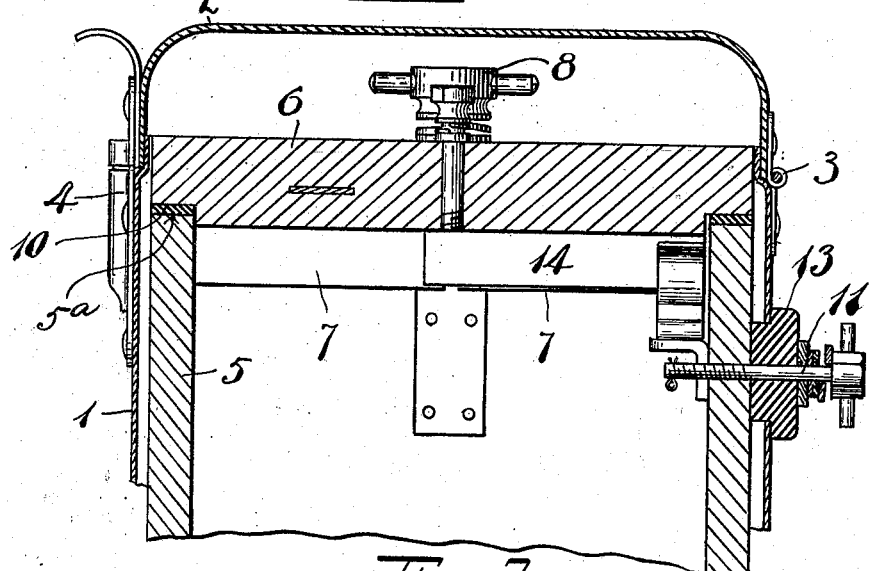
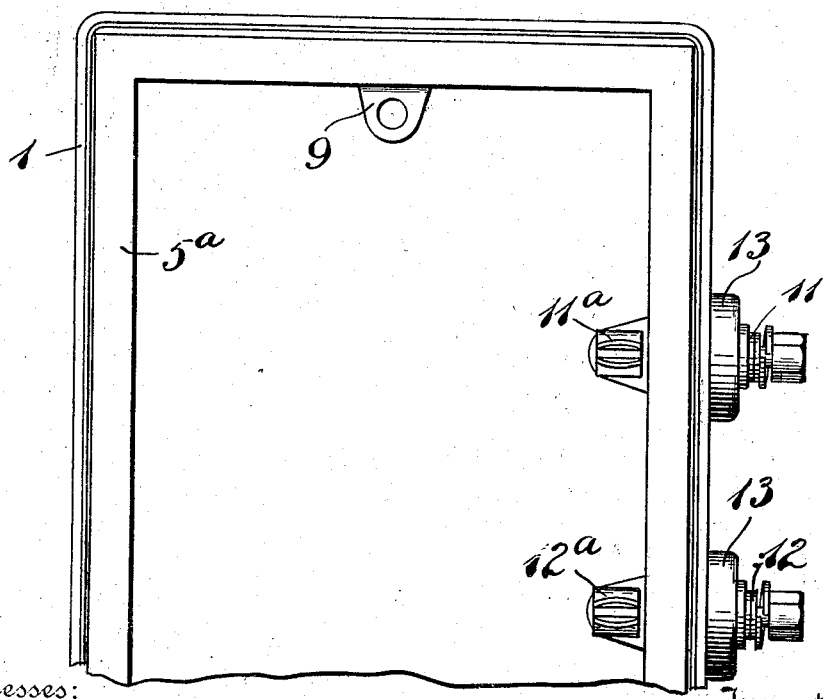

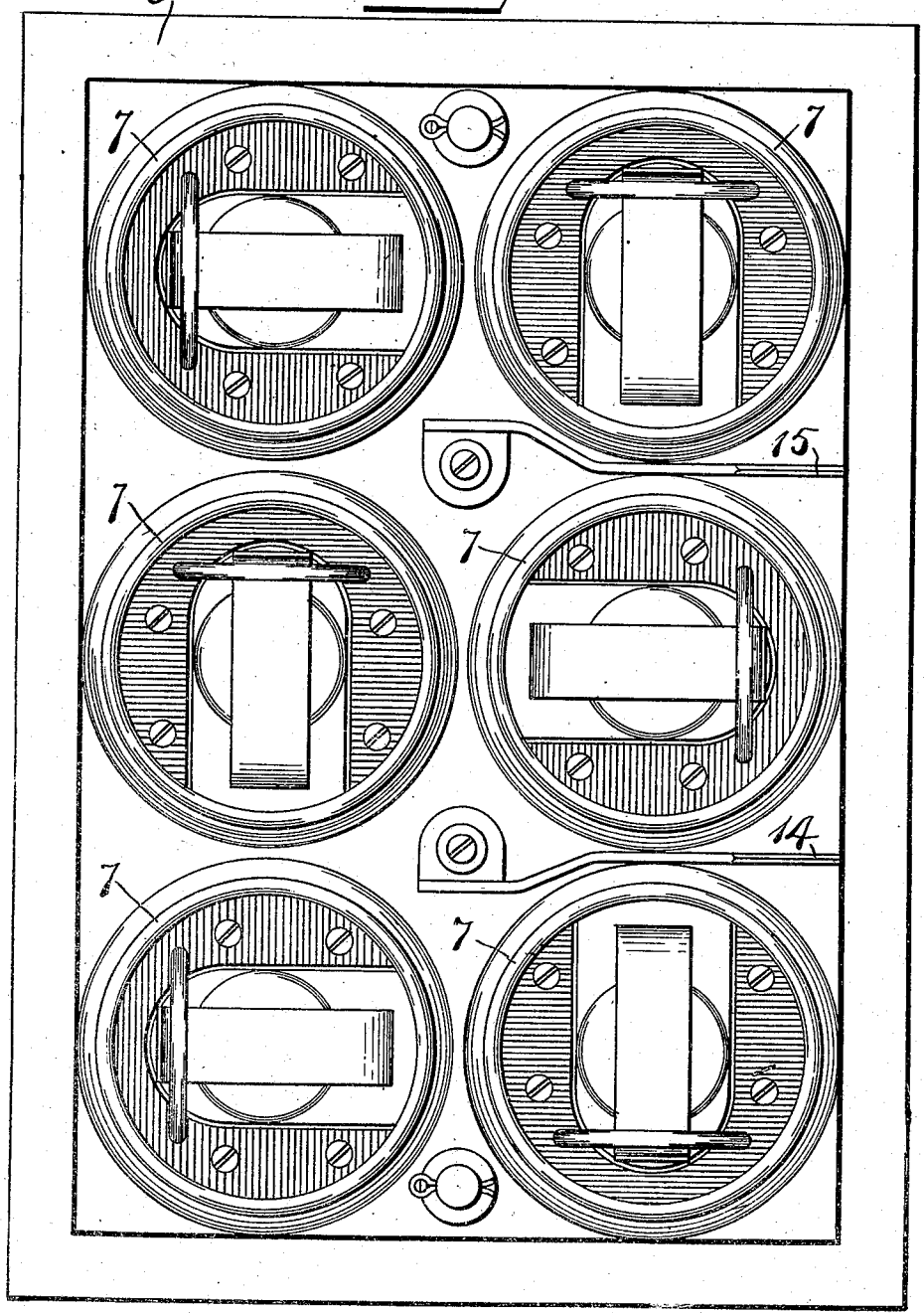

UNITED STATES PATENT OFFICE.

GEORGE LEWIS PATTERSON, OF NEW YORK, N. Y., ASSIGNOR TO ALICE C. PATTERSON, OF NEW YORK, N. Y.

BATTERY-BOX TERMINAL CONNECTION.

No. 924,576.   Specification of Letters Patent.   Patented June 8, 1909.

Application filed December 1, 1908. Serial No. 465,557.

*To all whom it may concern:*

Be it known that I, GEORGE LEWIS PATTERSON, a citizen of the United States, residing at the city of New York, county and State of New York, have invented certain new and useful Improvements in Battery-Box Terminal Connections, of which the following is a full, clear, and exact description.

My invention relates to improvements in batteries, and particularly to a battery box terminal connector.

In present automobile practice, for example, it is customary to have a strong (frequently iron) box designed to protect and shield the battery proper. This box is usually located on some readily accessible part of the machine, for example, the running board. The necessity for a strong and secure box for holding the batteries is so great that, in automobile practice, it is almost universal. While the particular field of usefulness for his invention is not limited to use on automobiles, the importance of the invention will perhaps be best understood by explaining the same in connection with such use.

In practice it becomes necessary from time to time to inspect or renew the batteries or individual cells thereof. This involves opening the box and removing the batteries. In cases where the batteries are of the modern socket type in which said batteries are suspended from an overhead carrier, as in the Gill patent No. 705,919, and as in the present instance, the only way of getting access to the several cells is by removing the group of batteries. This heretofore has involved a manual detachment of connecting wires which lead from the battery out through the box to the translating device, whatever that may be. This causes great annoyance and occupies much time.

The object of my invention, broadly speaking, is to provide simple and effective means whereby a group of battery cells held by a holder in common to said group, may be removed bodily from the box without any special effort and may be replaced with equal ease, the connections to the outgoing terminal wires being automatically broken and made incidental to said removal and replacement respectively.

In the accompanying drawings, Figure 1 is a section of a battery box and removable battery cell holder, the bottom of the box and holder being broken away. Fig. 2 is a plan view of the box, the cover being open, one end of said box being broken away. Fig. 3 is a relatively enlarged view of the under side of the cell holder head.

1 represents a box, in this instance of steel. 2 is a cover hinged therefor, 3 is the hinge therefor, 4 is any convenient locking mechanism which may be provided to hold the cover closed.

5 is the lining, which may be provided within the box if desired. This lining provides a supporting shoulder $5^a$, upon which a cell holder head member 6 may rest. This head member constitutes a battery carrier or support and is provided with suitable sockets 7—7 on its underside, (for example, such as shown in the former Gill patent above referred to) said sockets being arranged to receive and hold a group of cells.

It is unnecessary for me to describe at length herein the terminal construction employed in the sockets, it being understood that it is such that by merely inserting the cells in place in said sockets the terminal connections are automatically effected, so as to put all the cells in circuit. The head 6 may be secured tightly upon the supporting shoulder $5^a$ by means of clamp screws 8, which are arranged to screw into stanchions 9 conveniently located within the lining 5. If desired, a gasket 10 may be provided between the supporting shoulder $5^a$ and the head 6, whereby the space within the box may be sealed.

In such constructions as above described, it is necessary to have an outlet for the electric circuit. To that end I provide two binding posts 11 and 12. These binding posts are located outside of the steel box 1 and are suitably insulated therefrom by bushings 13—13. The inner ends of said binding posts project through the lining 5 and into the interior of the same. In the particular instance shown herein, the inner ends of the binding posts are indicated at $11^a$—$12^a$, and are each in the form of bifurcated spring clips arranged to receive between them contact blades 14—15 carried by the head 6 and representing respectively the positive and negative terminal outlets for the cell circuit. These blades 14—15 are properly positioned and spaced so that when the head 6 is dropped into place the blades 14—15 will make electrical contact with the outlets $11^a$—$12^a$ and posts 11—12. Obviously this 11 particular form of automatic connection may be modified in various ways. The several battery cells carried by the head are connected as desired, for example, in series, while the opposite terminals of the extreme end cells would be respectively connected by suitable binding posts or clips to the blades 14—15, so that when the head 6 is in place, all of such cells are so connected with said blades 14—15 as to transmit their current out through the binding posts 11 and 12.

What I claim is:

1. In a battery, a box or container, a battery carrier removably mounted in said box and adapted to carry a plurality of cells, terminals carried by said carrier, other terminals carried by said box, and means for automatically connecting the terminals of the carrier with the terminals of the box.

2. In a battery, a box, a battery cell carrier adapted to said box and removable therefrom, terminals on said carrier, companion terminals on said box, and means for connecting the former with the latter by the mere act of introducing said carrier in said box.

3. In a battery, a box or container, terminal outlets carried thereby, a cell carrier adapted to said box and removable therefrom, means carried by said carrier for receiving and supporting a plurality of battery cells, terminals carried by said carrier for receiving the cell circuits, means connected with said terminals and arranged to coöperate with the outlet terminals of the box whereby both sets of terminals are put in electrical contact automatically by placing the carrier in place within or above said box.

4. In a battery, a box, a cell carrier adapted thereto and means for detaching and removably securing the same within or above said box, means carried by said carrier for receiving and supporting a cell, terminals carried by said carrier for receiving cell circuits, outlet terminals carried by said box and electrically connecting devices between both of said sets of terminals for electrically connecting the cell circuit with the outlet terminals of the box when said carrier is in place and by the act of putting said carrier in place.

5. In a battery, a box having outlet terminals with interior contact means, a battery cell carrier adapted to said box and removable therefrom, terminals carried thereby with means extending from said terminals for electrically connecting said terminals with the outlet terminals of the box through the medium of the interior contacts and an independent support for said carrier.

GEORGE LEWIS PATTERSON.

Witnesses:
R. C. MITCHELL,
M. E. GARRETT.